United States Patent
Yoshimi

(10) Patent No.: US 6,208,597 B1
(45) Date of Patent: Mar. 27, 2001

(54) TRANSFER CONTROL SYSTEM OF INFORMATION READ BEAM

(75) Inventor: Takashi Yoshimi, Saitama (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/199,814

(22) Filed: Nov. 25, 1998

(30) Foreign Application Priority Data

Nov. 28, 1997 (JP) .................................................... 9-344342
Nov. 28, 1997 (JP) .................................................... 9-344343

(51) Int. Cl.$^7$ ........................................................ G11B 7/00
(52) U.S. Cl. .................................. 369/44.29; 369/44.35; 369/94; 369/44.25
(58) Field of Search ............................ 369/44.27, 44.29, 369/44.34, 44.35, 94, 44.25

(56) References Cited

U.S. PATENT DOCUMENTS 5,835,460 * 11/1998 Nishikata ........................... 369/44.25

FOREIGN PATENT DOCUMENTS

| 0 749 117 | 12/1996 | (EP) . |
| 0 762 397 | 3/1997 | (EP) . |
| 0 775 998 | 5/1997 | (EP) . |
| 0 807 926 | 11/1997 | (EP) . |
| 0 840 295 | 5/1998 | (EP) . |

* cited by examiner

Primary Examiner—Nabil Hindi
(74) Attorney, Agent, or Firm—Sughrue, Mion, Zinn, Macpeak & Seas, PLLC

(57) ABSTRACT

A transfer control system of an information read beam for transferring an information read beam from one recording side to another in an information reader comprising offset error signal generation means for piggybacking a predetermined offset level onto a focus error signal indicating a shift from the focus position of the information read beam to generate an offset error signal in order to shape the beam form of the information read beam for reading record information from an information recording medium having a plurality of laminated recording sides on the recording side. It comprises offset level setting means for setting the predetermined offset level in the offset error signal generation means, transfer signal generation means for generating a transfer signal for forcibly transferring the information read beam, and transfer means for transferring the information read beam from one recording side to another based on the transfer signal. The transfer signal generation means generates the transfer signal after the offset level setting means clears setting of the offset level.

2 Claims, 4 Drawing Sheets

TRANSFER CONTROL SYSTEM OF INFORMATION READ BEAM

BACKGROUND OF THE INVENTION

1. Field of the Invention

This invention relates to a transfer control system of an information read beam for transferring an information read beam applied from the same application direction from one recording side to another of an information recording medium having a plurality of laminated recording sides.

2. Description of the Related Art

For example, a two-layer disc of a DVD (digital versatile disc) is known as the above-mentioned information recording medium. As shown in FIG. 1, the two-layer disc has a structure wherein a recording side of a substrate L1 coated with a total reflection film of aluminum (Al) and a recording side of a substrate L0 coated with a semi-transparent film formed of gold (Au), a dielectric substance, etc., providing a reflection factor of about 30% are laminated with a ultraviolet-setting resin material having high light transmittance such as a photopolymer resin with the recording sides facing each other. An information read beam is applied from one side (the substrate L0 side in FIG. 1). Information on each recording side can be read by forcibly transferring the focus position of the applied information read beam from the substrate L0 to the substrate L1 or from L1 to L0 (focus jumping).

A specific focus jumping method is as follows: To a focus actuator for driving an object lens in a focus direction, a kick signal at a predetermined level, which is a transfer signal for forcibly driving the object lens in acceleration, is supplied only for a predetermined time, and then a brake signal at a predetermined level, which is a transfer signal for forcibly driving the object lens in deceleration, is supplied for a predetermined time. The predetermined levels and the predetermined times are determined based on the sensitivity of the actuator (the acceleration produced when a unit drive current is supplied) and the read beam transfer distance.

For example, with a reader for reading digital information from a recording medium on which digital information is recorded such as a DVD or a CD (compact disc), the focus position of an object lens is set so that the spot form of a read beam on the disc becomes elliptic rather than circular to decrease the jitter component of a read signal. More particularly, as shown in FIG. 1, the focus position of the object lens is set so that the long axis direction of an elliptic spot 12 becomes perpendicular to the tangent direction of a track formed by pits 11 (the short axis direction of the elliptic spot becomes parallel to the tangent direction of the track). That is, in such focus servo control for the recording medium, a predetermined DC level is piggybacked as an offset level on a focus error signal indicating the shift amount from the focus position of the information read beam and servo control is performed based on the error signal with the offset level piggybacked thereon, thereby aggressively offsetting as much as the distance corresponding to the offset level from the focus position for changing the spot form of the read beam on the disc from circular to elliptic.

In the initialization operation before information is read, while the offset level to be piggybacked is swung in a predetermined range, for example, a read signal error rate is measured and the level at which the error rate becomes the minimum is set as the predetermined offset level mentioned above.

By the way, the optimum offset level is set separately for each of the two recording sides of a two-layer disc. Thus, if the above-described spot form shaping is performed on the two-layer disc, the read beam transfer distance by the above-mentioned focus jumping varies from one disk to another in response to the offset amount set for each recording side. Therefore, the amplitude levels and durations (pulse widths) of the kick signal and the brake signal of the transfer signals must be set for each disc. An S-letter waveform of a focus error signal appearing as the read beam is transferred is used to indicate the supply timing of the transfer signal (brake signal) for forcibly driving the object lens in deceleration by comparing the amplitude level of the S-letter waveform with a predetermined threshold value. As the above-mentioned offset is piggybacked, the amplitude level of the appearing S-letter waveform is offset in response to the read beam transfer direction (from one recording side to the other or from the other recording side to one), and the threshold value must be set in response to the transfer direction. Also, if the reflection factor varies from one recording side to another, the amplitude level of the appearing S-letter waveform changes with the recording side to which the read beam is transferred; the brake signal amplitude level and duration must be set each time and the setting job is intricate.

Since an offset is thus piggybacked to shape the read beam spot form, it becomes intricate to set the transfer signals involved in the focus jumping.

SUMMARY OF THE INVENTION

The present invention has been made to solve the above problems, and it is therefore an object of the invention to provide a transfer control system of a read beam eliminating the need for performing an intricate setting job of transfer signals although the transfer control system causes focus jumping to be performed from one recording side to another in an information reader with the read beam spot form shaped so as to make it possible to decrease jitter when reading digital information.

In order to achieve the above object, according to a first aspect of the invention, there is provided a transfer control system of an information read beam comprising offset error signal generation means for piggybacking an offset level onto a focus error signal indicating a shift from the focus position of an information read beam to generate an offset error signal in order to shape the beam form of the information read beam applied from the same application direction for reading record information from an information recording medium having a plurality of laminated recording sides on the recording side, transfer signal generation means for generating a transfer signal for forcibly transferring the information read beam from one recording side to another, and transfer means for transferring the information read beam from one recording side to another based on the transfer signal, characterized in that the transfer signal generation means inhibits the offset error signal generation means from piggybacking the offset level, then generates the transfer signal.

According to the function of the first aspect of the invention, the transfer signal generation means for generating a transfer signal for forcibly transferring the information read beam from one recording side to another generates the transfer signal after the offset error signal generation means for piggybacking an offset level to shape the spot form of the information read beam on the recording side inhibits piggybacking the offset level. Therefore, the offset level to shape the spot form of the information read beam is not supplied during the focus jumping, thus the transfer distance becomes equal to the layer-to-layer distance of the disc, so that the transfer signal duration and amplitude level to be adopted can be determined uniquely by the sensitivity of a focus actuator and the layer-to-layer distance of the disk. Since the offset as the offset level is removed from the amplitude level of an S-letter waveform, the threshold value having the same absolute value independently of the information read beam transfer direction can be adopted. This means that the threshold values for indicating the transfer signal duration and amplitude level and the brake signal supply timing can be set uniquely in response to the layer-to-layer distance defined on the disc standard and the sensitivity of a focus actuator of an information reader and thus it is not necessary to again set transfer signals so long as the disc played back with the information reader matches the standard.

Also, according to a second aspect of the invention, there is provided a transfer control system of an information read beam for transferring an information read beam applied from the same application direction to read record information from an information recording medium having a plurality of laminated recording sides from one recording side to another, the transfer control system comprising focus servo means for performing focus control of the information read beam based on a focus error signal indicating a shift from a focus position of the information read beam, gain setting means for setting the gain of the focus servo means fitted to each of the recording sides, transfer signal generation means for generating a kick signal for driving the information read beam in acceleration and a brake signal for driving the information read beam driven in acceleration in deceleration, and transfer means for transferring the information read beam from one recording side to another based on the kick signal and the brake signal, characterized in that when the information read beam is transferred, the gain setting means changes the gain from the gain fitted to one recording side to the gain fitted to another before the transfer signal generation means generates the brake signal.

According to the function of the second aspect of the invention, when transfer of the information read beam is started, the gain setting means changes the gain from the gain fitted to one recording side to the gain fitted to another to which focus jumping is to be applied before the transfer signal generation means generates the brake signal.

Therefore, even if one recording side and another recording side differ in reflection factor, the focus jumping between the recording sides different in reflection factor becomes equivalent to focus jumping between recording sides having the same reflection factor during the focus jumping, thus the transfer signal duration and amplitude level can be uniquely found by the sensitivity of a focus actuator and the layer-to-layer distance of the disc.

DETAILED DESCRIPTION OF THE PREFERRED EMBODIMENTS

A description will be given in more detail of preferred embodiments of the invention with reference to the accompanying drawings.

Figure 1:
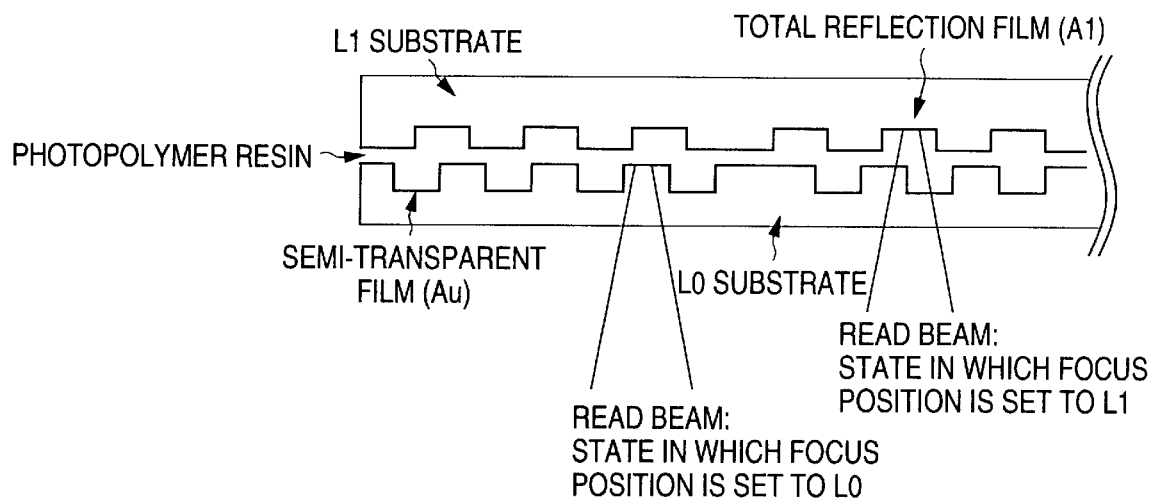
FIG. 1 is an illustration to show the structure of a two-layer disc of an example of an information recording medium having a plurality of laminated recording sides.
Figure 2:
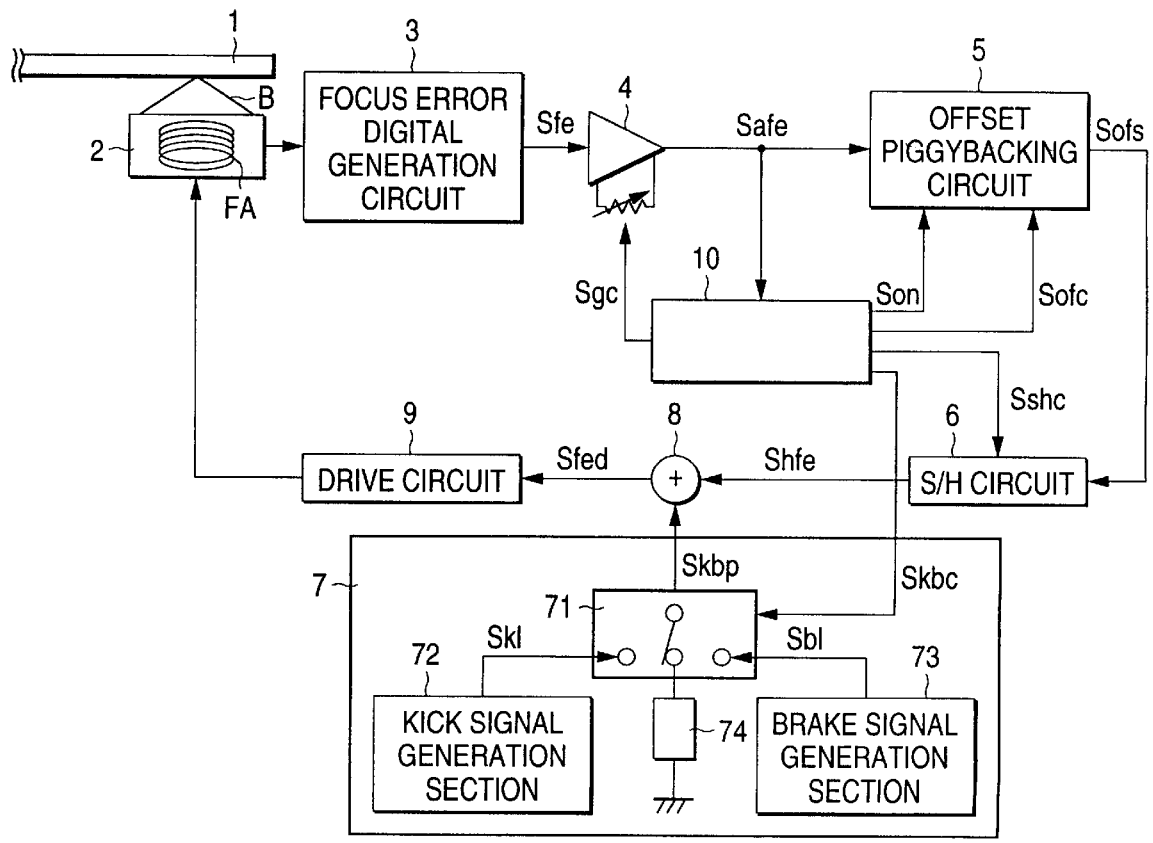
FIG. 2 is a diagram to show a configuration example of a transfer control system in an embodiment of the invention.

FIG. 2 shows a specific configuration example of a transfer control system of an information read beam of an embodiment of the invention. In the embodiment, an example of adopting a two-layer disc as an information recording medium will be discussed.

In FIG. 2, a pickup 2 receives reflected light of a read beam B applied to a two-layer disc 1 at a four-division detector (not shown) and supplies an electric signal responsive to the light reception amount of the detector to a focus error signal generation circuit 3, which then generates a focus error signal Sfe by performing predetermined operation based on an astigmatism method, for example, on the supplied electric signal and outputs the focus error signal Sfe to an amplification circuit 4.

The amplification circuit 4 amplifies the supplied focus error signal Sfe with a predetermined gain set based on a gain setting signal Sgc supplied from a control section 10 (described later) to generate an amplified error signal Safe and outputs the amplified error signal Safe to an offset piggybacking circuit 5 as offset error signal generation means and the control section 10.

As the gain value of the amplification circuit 4 for each recording side, at the focus servo adjustment time in the initialization operation before information is read, a control section 10 (described later) detects the amplitude level of an S-letter signal of a focus error signal provided when a focus servo loop is open from an output signal of the amplification circuit 4 and calculates the gain value at which the amplitude level becomes a predetermined level, then sets the gain value as the predetermined gain value. The gain value found for each recording side is stored in the control section 10. The gain of the amplification circuit 4 is set to the predetermined gain value fitted to each recording side, whereby the amplitude levels of the S-letter signals provided from the amplification circuit 4 become roughly constant regardless of the recording side. The amplification circuit 4 and the control section 10 thus make up gain setting means.

Figure 3:
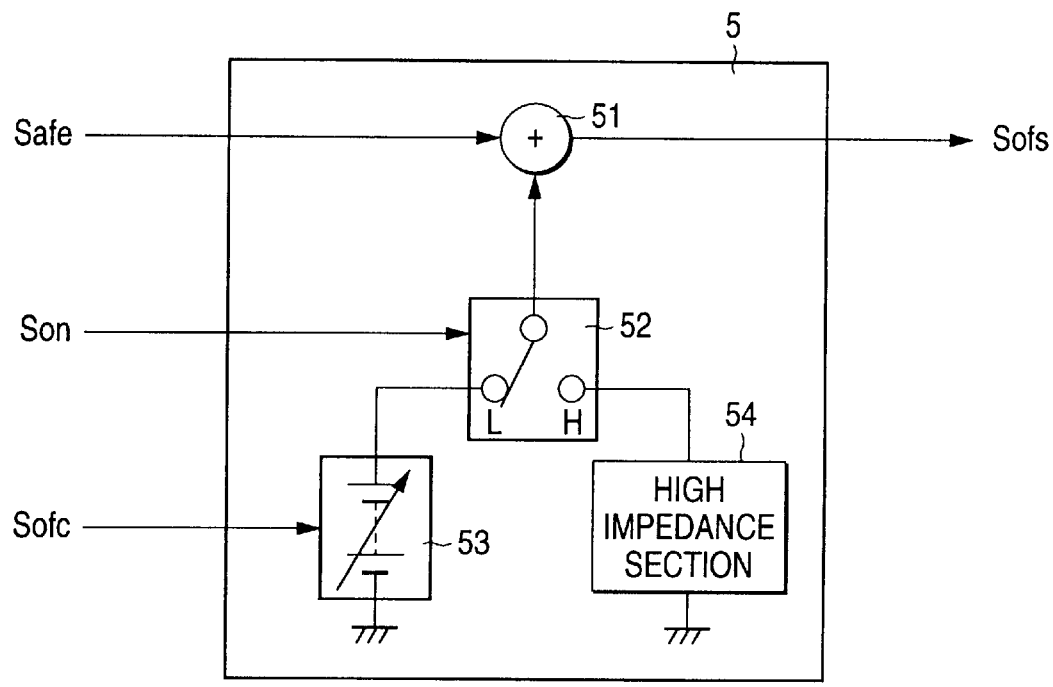
FIG. 3 is a diagram to show a configuration example of an offset piggybacking circuit 5 in the embodiment of the invention.

The offset piggybacking circuit 5 includes an addition circuit for piggybacking an offset level onto a focus error signal, a changeover switch 52 and a voltage setting circuit 53 for setting an offset level, and a high impedance element 54, for example, as shown in FIG. 3. When an offset piggyback signal Son from the control section 10 is high, the changeover switch 52 connects to an H terminal position to which the high impedance element 54 is connected for supplying the offset level to the addition circuit 51 as a zero level (with no offset piggybacked). When the offset piggyback signal Son is low, the changeover switch 52 connects to an L terminal position for supplying the DC level set by the voltage setting circuit 53 in response to an offset level setting signal Sofc supplied from the control section 10 to the addition circuit 51 as the offset level to be piggybacked. Therefore, the addition circuit 51 piggybacks the offset level supplied via the changeover switch 52 on the amplified error signal Safe from the amplification circuit 4 to generate an offset error signal Sofs and outputs the offset error signal Sofs to an S/H (sample hold) circuit 6.

Figure 7:
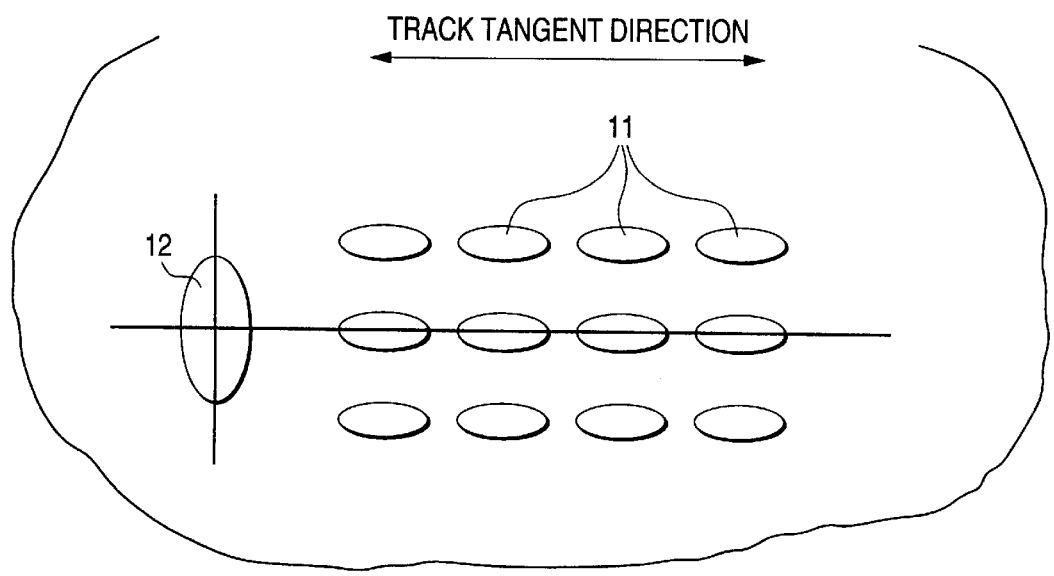
FIG. 7 is an illustration to show the appearance of an information read beam spot form on an information recording medium.

The purpose of piggybacking an offset is to set the focus position of an object lens so that the spot form of a read beam on the disc becomes elliptic rather than circular to decrease the jitter component of a read signal. More particularly, as shown in FIG. 7, the focus position of the object lens is set so that the two-layer disc 1 is placed at the position of a spot 12 where the long axis direction of the ellipse becomes perpendicular to the tangent direction of a track formed by pits 11 (the short axis direction of the ellipse becomes parallel to the tangent direction of the track). That is, in focus servo control for the two-layer disc 1, a predetermined DC level is piggybacked as an offset level on a focus error signal indicating the shift amount from the focus position of the information read beam and servo control is performed based on the error signal with the offset level piggybacked thereon, thereby aggressively offsetting as much as the distance corresponding to the offset level from the focus position for changing the spot form of the read beam on the disc from circular to elliptic.

Therefore, the spot form of the information read beam undergoing focus servo control based on the focus error signal offset according to the DC level set by the voltage setting circuit 53 of the offset piggybacking circuit 5 becomes like an ellipse with the short axis direction parallel with the track tangent direction.

In the initialization operation before information is read, while the offset level to be piggybacked is swung in a predetermined range, for example, a read signal error rate is measured and the level at which the error rate becomes the minimum is preset as the predetermined offset level mentioned above.

The spot form of an information read beam undergoing focus servo control based on the focus error signal offset according to the DC level set by the voltage setting circuit 53 of the offset piggybacking circuit 5 becomes like an ellipse with the short axis direction parallel with the track tangent direction.

Figure 4:
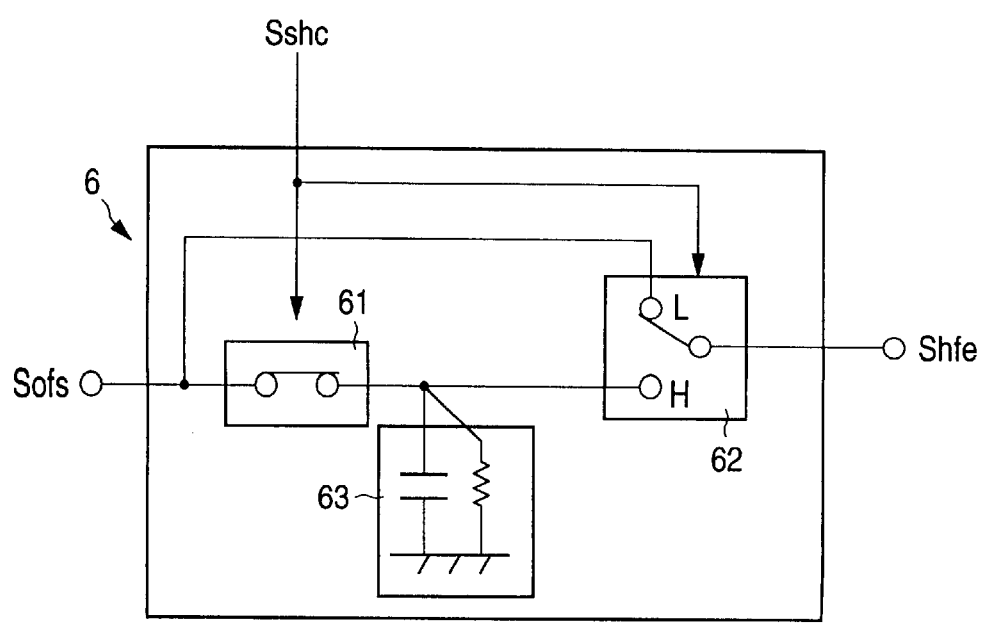
FIG. 4 is a diagram to show a configuration example of an S/H circuit 6 in the embodiment of the invention.

The S/H circuit 6 comprises an open/closed switch 61, a changeover switch 62, and a hold circuit 63, for example, as shown in FIG. 4. When a hold command signal Sshc from the control circuit 10 is low, the open/closed switch 61 is closed and the changeover switch 62 connects to an L terminal position for supplying the supplied offset error signal Sofs to the addition circuit 8 as a hold error signal Shfe. When the hold command signal Sshc is high, the open/closed switch 61 is opened and the changeover switch 62 connects to an H terminal position, thereby supplying the offset error signal Sofs held in the hold circuit 63 just before the open/closed switch 61 is opened to the addition circuit 8 as the hold error signal Shfe.

Referring again to FIG. 3, a transfer signal generation section 7 comprises a changeover switch 71, a kick signal generation section 72 for generating a kick signal Skl for driving a focus actuator FA in acceleration, a brake signal generation section 73 for generating a brake signal Sbl for driving the focus actuator FA in deceleration, and a high impedance element 74. It selectively supplies the kick signal Skl, the brake signal Sbl, or a zero level (with nothing added) to the addition circuit 8 in response to a two-bit transfer control signal Skbc from the control section 10.

The addition circuit 8 piggybacks a transfer signal Skbp supplied from the transfer signal generation section 7 on the offset error signal supplied via the S/H circuit 6 to generate a piggyback pulse signal Sfed and outputs the piggyback pulse signal Sfed to a driver circuit 9.

The driver circuit 9 amplifies power of the supplied piggyback pulse signal Sfed and drives the focus actuator FA as transfer means placed in the pickup 2 at the acceleration responsive to the amplitude level of the piggyback pulse signal Sfed in the direction responsive to the polarity of the piggyback pulse signal Sfed.

Last, the control section 10 comprises a control CPU (not shown) and RAM (random access memory) -not shown- for storing a control program of the control CPU and the setup values of gain value of the amplification circuit 4, offset level, etc., for each recording side provided by the initialization operation performed before the information read operation. The control section 10 supplies the gain setting signal Sgc, the offset piggyback signal Son, the offset level setting signal Sofc, the hold command signal Sshc, and the transfer control signal Skbc appropriately to the amplification circuit 4, the offset piggybacking circuit 5, the S/H circuit 6, and the transfer signal generation section 7 based on the control program and the setup values stored in the RAM, and mainly controls the operation of the whole information reader.

The reason why the gain of the amplification circuit 4 is set for each recording side in the initialization operation is that the recording sides of a two-layer disc do not necessarily match in reflection factor because of the structure. Therefore, at the focus servo adjustment time in the initialization operation before information is read, the control section 10 detects the amplitude level of an S-letter signal of a focus error signal provided when a focus servo loop is open from the output signal of the amplifier circuit 4 and calculates a gain value at which the amplitude level becomes a predetermined level, then sets the result as the predetermined gain value. The gain values for the recording sides are stored in the RAM of the control section 10. The gain of the amplification circuit 4 is set to the predetermined gain value fitted to each recording side, whereby the amplitude levels of the S-letter signals provided from the amplification circuit 4 become roughly constant regardless of the recording side.

Figure 5:
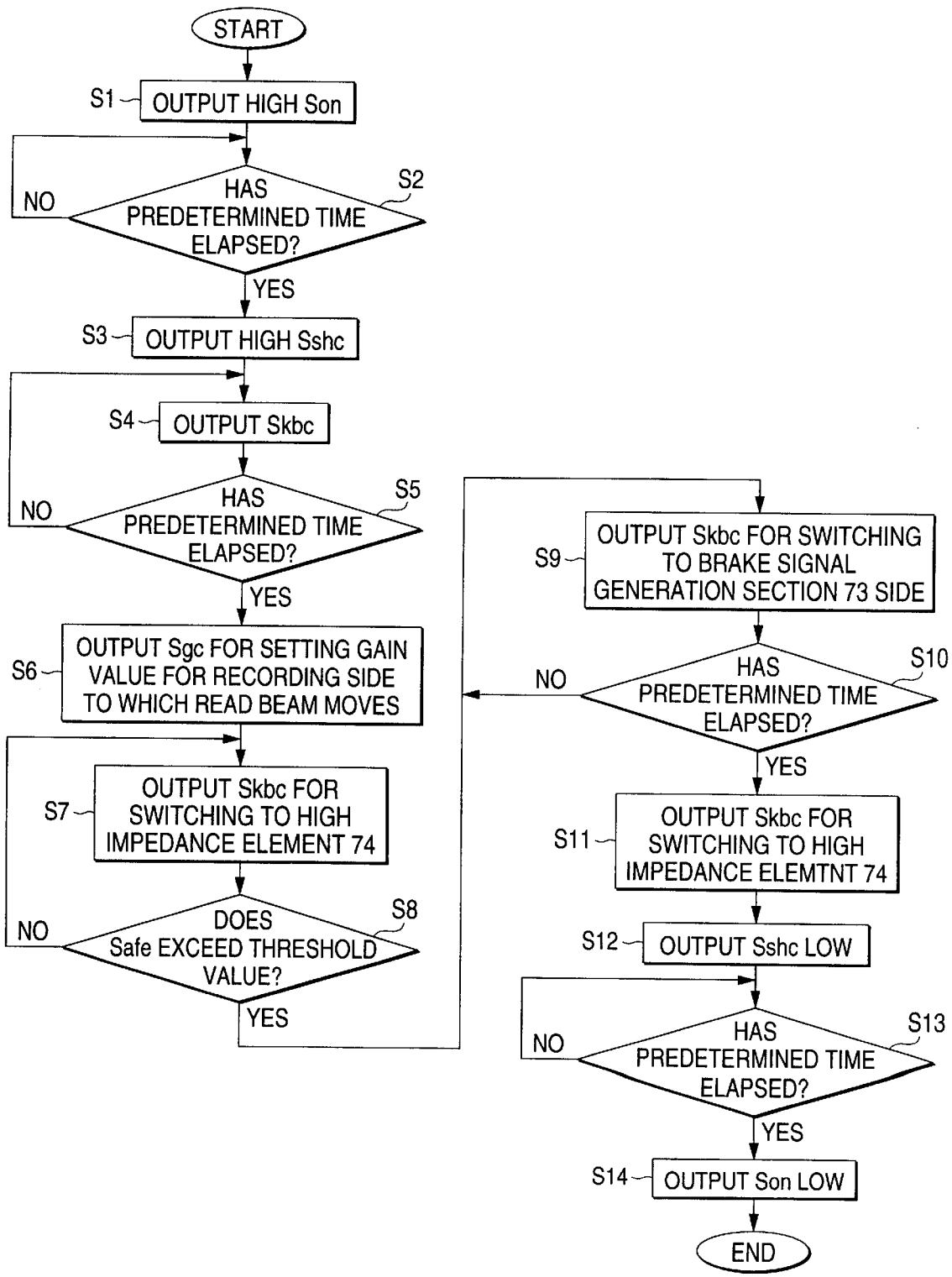
FIG. 5 is a flowchart to show an example of the transfer control operation performed by a control section 10 in the embodiment of the invention.

Next, the transfer control operation performed by the control section 10 in the described transfer control system of an information read beam will be discussed with reference to FIGS. 5 and 6. FIG. 5 is an operation flowchart for transfer control performed by the control section 10 and FIG. 6 is a waveform chart in the main part of the transfer control system shown in FIG. 2 appearing as the transfer control operation is performed.

Figure 6:
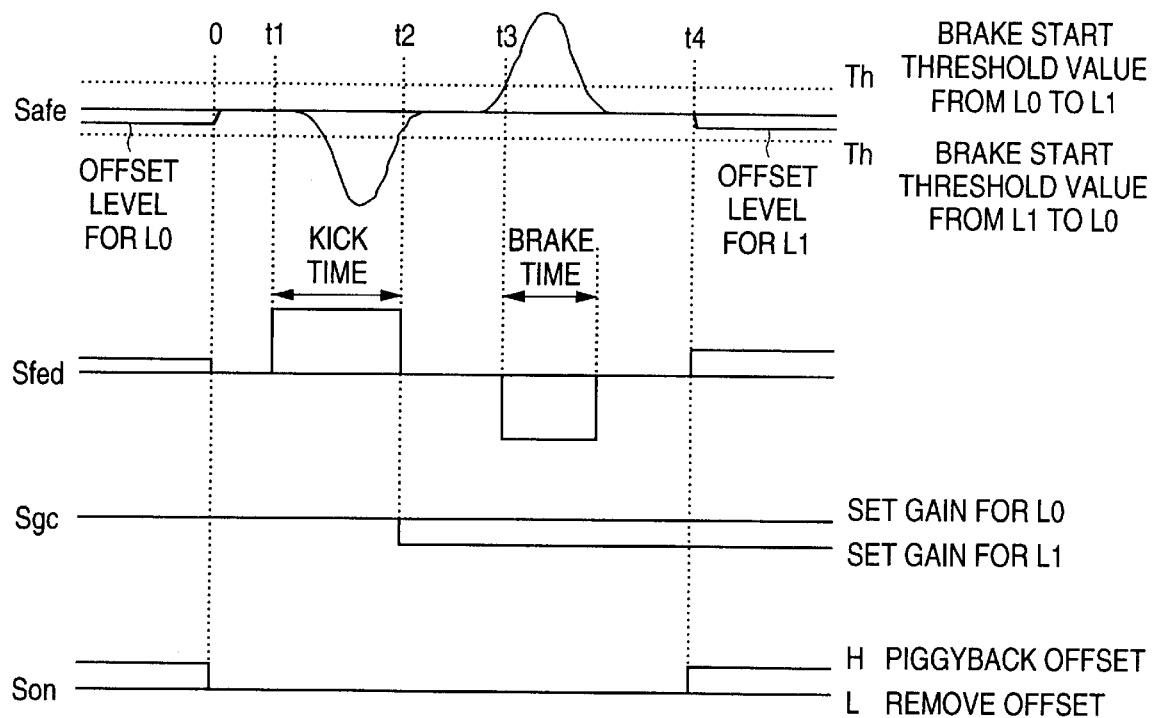
FIG. 6 is a chart to show waveforms appearing in the main part in FIG. 2 when transfer control in the embodiment of the invention is performed.

Now, assume that a focus jump command from the first recording side L0 to the second recording side L1 of a two-layer disc is entered through operation means such as a keyboard (not shown) at timing 0 in FIG. 6.

The control section 10 first stops the current job being executed and outputs an offset piggyback signal Son which is high to the offset piggybacking circuit 5 to set the offset level piggybacked on a focus error signal Safe to a zero level, namely, inhibit piggybacking of the offset piggybacked to shape the spot form of a read beam at step S1.

Next, a wait is made for sufficient time t1 (for example, about several $\mu$s) to absorb disturbance of a focus servo loop produced by removing the offset level at step S1 and for the focus servo to be again locked as shown in FIG. 6 at step S2.

After a lapse of the time t1, the control section 10 supplies a hold command signal Sshc which is high to the S/H circuit 6 at step S3. The high hold command signal Sshc opens the open/closed switch 61 of the S/H circuit and switches the changeover switch 62 to the H terminal position, thus supply of the focus error signal carrying the current focus direction position information of an information read beam is shut off, and the focus servo loop is substantially opened. Therefore, the S/H circuit 6 outputs the error signal held by the hold circuit 63 just before the servo is opened (the error signal is obtained with offset removed and the focus servo locked).

Next, the control section 10 outputs a transfer control signal Skbc for predetermined time (t2−t1) at steps S4 and S5. The transfer control signal Skbc switches the switch 71 to the input position of a signal Skl for the predetermined time, thus the kick signal generation section 72 supplies a DC signal having a predetermined amplitude level as shown in FIG. 5 to the addition circuit 8 as a transfer signal Skbp for the predetermined time (t2−t1). The predetermined time (t2−t1) can be uniquely found by the sensitivity of the focus actuator FA and the inter-layer distance of the two-layer disc 1 because no offset is applied. That is, the operation of the actuator at steps S4 and S5 becomes so-called uniformly accelerated linear motion, thus if the sensitivity of the actuator is x (m/s$^2$/A) and the inter-layer distance is y ($\mu$m) and the predetermined amplitude level is set to a level corresponding to 1 (A) at the output stage of the driver circuit 9 (the maximum accelerating level of the actuator FA in the embodiment), the predetermined time (t2−t1) can be found as $(y/x)^{1/2}$. In this example, however, the distance for the actuator to make uniformly accelerated linear motion is about a half the inter-layer distance.

For the supply time (t2−t1) of the kick signal Skl thus found, the kick signal Skl is piggybacked on the immediately preceding error signal (roughly zero level) for opening the servo loop supplied from the S/H circuit 6 in the addition circuit 8 and the resultant signal is supplied as Sfed shown in FIG. 6 to the focus actuator FA of the transfer means via the driver circuit 9. Then, the signal causes the actuator FA to transfer the object lens, namely, the information read beam in the direction of the recording side L1.

Next, after a lapse of the predetermined time, the control section 10 outputs a gain setting signal Sgc to set the gain of the amplification circuit 4 to the gain value fitted to the second recording side L1 at step S6. After the kick signal is thus supplied, namely, while the information read beam is moving from the first recording side L0 to the second recording side L1, the gain of the amplification circuit 4 is again set to the gain value matching the reflection factor of the recording side to which the information read beam moves, whereby the reflection factor difference between the first and second recording sides is absorbed. That is, the amplitude level at which the level appearing on the first recording side L0 (lower peak level appearing between times t1 and t2 in FIG. 6) and the level appearing on the second recording side L1 (upper peak level appearing between times t3 and t4 in FIG. 6), of the S-letter signal of the focus error signal appearing as the read beam moves away from the focus position can be compared on the same scale, namely, normalized amplitude level can be set. Thus, particularly the brake signal generation timing becomes the same regardless of the read beam transfer direction (from the recording side L0 to L1 or from L1 to L0), as described later.

Next, the control section 10 outputs a transfer control signal Skbc for switching the changeover switch 71 to the high impedance element 74 at step S7, thus the transfer signal Skbp becomes zero level. That is, in this state (the t2 to t3 period in FIG. 6), a drive signal is not supplied to the actuator (precisely, a hold error signal Shfe is supplied from the S/H circuit 6, but servo control is performed with no offset at step S1, thus the hold error signal Shfe holding the error signal with the servo control performed is roughly at zero level). The actuator in the state is in a coasting state of the acceleration motion by the supplied kick signal at steps S4 and S5 and continues the move operation in the direction of the second recording side L1, namely, the uniformly accelerated linear motion at roughly the same speed as the last speed vmax accelerated during the acceleration period. The operation at step S7 is continued until time t3 at which the focus error signal Safe given through the amplification circuit 4 exceeds a predetermined threshold value Th at step S8.

The predetermined threshold value Th is used to indicate the generation timing of the brake signal Sbl and is determined by the sensitivity of the actuator and the remaining transfer distance. To stably perform the pull-in operation to the focus servo after the focus jump, the information read beam transfer speed needs to be sufficiently reduced to such speed capable of pulling into the focus servo in the proximity of the focus position. However, if the transfer speed is too reduced, the read beam loses speed before it arrives at the desired recording side. Then, the threshold value Th is determined so that the read beam transfer speed becomes predetermined speed vr of sufficiently slow speed to pull into the focus servo at the focus position on the second recording side L1.

That is, the last speed of the information read beam, vmax, under the acceleration control at steps S4 and S5 can be expressed as x(t2−t1) because the sensitivity of the actuator is x. Therefore, the deceleration control start position from the last speed x(t2−t1) to set the read beam move speed at the focus position to the predetermined speed vr becomes the position $$(x(t2-t1)^2-vr^2)/2x \qquad (1)$$

away from the focus position on the second recording side L1.

This means that uniformly accelerated linear motion (deceleration motion) is made the distance indicated by Expression 1, whereby the read beam move speed is reduced to vr from vmax. At the time, the time corresponding to the distance expressed by Expression 1 is $$(x(t2-t1)-vr)/x \qquad (2)$$

Therefore, the focus error amplitude level corresponding to Expression 1 is set as the predetermined threshold value Th and when the focus error signal appearing as the read beam moves exceeds the threshold value Th, the control section 10 outputs a transfer control signal Skbc for switching the changeover switch 71 to the Sbl input position for the time given by Expression 2 at steps S9 and S10, so that a DC signal having predetermined amplitude level shown in FIG. 5 (amplitude level for accelerating (decelerating) the actuator at the maximum and in the embodiment, level which becomes 1A at the output stage of the driver 10) from the brake signal generation section 73 as the transfer signal Skbp is supplied to the addition circuit 8 for the time given by Expression 2.

At the time, since the gain set in the amplification circuit 4 is changed at step S6, the focus error signal sensitivity on the first recording side L0 (error signal amplitude change amount relative to unit change amount from focus position) and that on the second recording side L1 are assumed to be the same and as the offset is removed at step S1, the offset responsive to the transfer direction appearing on the S-letter waveform is also removed. Thus, changing the absolute value of the threshold value Th depending on the focus jumping direction is not required. This means that the absolute value of the predetermined threshold value Th carrying the brake signal generation timing need not be set again each time the recording side reflection factor varies and intricacy of the setting job performed by the control section 10 can be decreased.

Next, the control section 10 outputs a transfer control signal Skbc for switching the changeover switch 71 to the high impedance element 74 to set the transfer signal Skbp to zero level at step S11. Thus, piggybacking the transfer signal Skbp onto the hold error signal Shfe is inhibited and a hold command signal Sshc is output low at step S12, so that the focus servo loop is closed, namely, the open/closed switch 61 in the S/H circuit 6 is closed and the changeover switch 62 is switched to the L terminal position. Then, the control section 10 stands by for the time required for the focus servo to be locked at step S13, then outputs an offset piggyback signal Son low at step S14 and piggybacks the voltage level fitted to the second recording side L1 set in response to the offset level setting signal Sofc as the offset level.

In the description of the embodiment, the recording sides of the two-layer disc differ in reflection factor, but if they are assumed to have the same reflection factor, step S6 can be omitted.

In the embodiment, the focus jump operation on the two-layer disc has been described, but the invention can be applied to the focus jump operation on a recording medium with two or more recording sides laminated.

As was described above, according to the first aspect of the invention, the transfer signal generation means for generating a transfer signal for forcibly transferring an information read beam from one recording side to another generates the transfer signal after piggybacking the offset level to shape the spot form of the information read beam on the recording side is inhibited. Therefore, the offset level becomes zero during the focus jumping and the read beam move distance becomes roughly equal to the layer-to-layer distance of the disc, so that the transfer signal duration and amplitude level and threshold value to be adopted can be determined uniquely by the sensitivity of the focus actuator and the layer-to-layer distance of the disk. This means that the threshold values for indicating the transfer signal duration and amplitude level and the brake signal supply timing can be set uniquely in response to the layer-to-layer distance defined on the disc standard and the sensitivity of the focus actuator of an information reader and thus if the disc played back with the information reader matches the standard, it is not necessary to again set transfer signals and intricacy of the setting job involved in the focus jump can be decreased.

Also, according to the second aspect of the invention, when transfer of the information read beam is started, the gain setting means changes the gain from the gain fitted to one recording side to the gain fitted to another to which focus jumping is to be applied before the transfer signal generation means generates the brake signal. Therefore, even if one recording side and another recording side differ in reflection factor, the focus jumping between the recording sides different in reflection factor becomes equivalent to focus jumping between recording sides having the same reflection factor during the focus jumping, thus the transfer signal duration and amplitude level can be uniquely found by the sensitivity of the focus actuator and the layer-to-layer distance of the disc. Therefore, intricacy of again setting the brake signal duration and amplitude level based on a different reflection factor in response to the recording side to which focus jumping is to be applied can be decreased.

What is claimed is:

1. A transfer control system of an information read beam, comprising:

offset error signal generation means for piggybacking an offset level onto a focus error signal indicating a shift from a focus position of an information read beam to generate an offset error signal in order to shape a beam form of the information read beam applied from the same application direction for reading record information from an information recording medium having a plurality of laminated recording sides on the recording side;

transfer signal generation means for generating a transfer signal for forcibly transferring the information read beam from one recording side to another; and transfer means for transferring the information read beam from one recording side to another based on the transfer signal;

wherein said transfer signal generation means inhibits said offset error signal generation means from piggybacking the offset level, then generates the transfer signal.

2. A transfer control system of an information read beam for transferring an information read beam applied from the same application direction to read record information from an information recording medium having a plurality of laminated recording sides from one recording side to another, said transfer control system comprising:

focus servo means for performing focus control of the information read beam based on a focus error signal indicating a shift from a focus position of the information read beam;

gain setting means for setting a gain of said focus servo means fitted to each of the recording sides;

transfer signal generation means for generating a kick signal for driving the information read beam in acceleration and a brake signal for driving the information read beam driven in acceleration in deceleration; and transfer means for transferring the information read beam from one recording side to another based on the kick signal and the brake signal;

wherein when the information read beam is transferred, said gain setting means changes the gain from the gain fitted to one recording side to the gain fitted to another before said transfer signal generation means generates the brake signal.

* * * * *